(12) United States Patent  (10) Patent No.: US 7,490,846 B2
Kaun  (45) Date of Patent: Feb. 17, 2009

(54) SELF-ADJUSTING FIFTH WHEEL TRAILER HITCH

(75) Inventor: Elden Kaun, Penhold (CA)

(73) Assignee: Petrokaun Oils Ltd., InnisPail (CA)

( * ) Notice: Subject to any disclaimer, the term of this patent is extended or adjusted under 35 U.S.C. 154(b) by 132 days.

(21) Appl. No.: 11/211,667

(22) Filed: Aug. 26, 2005

(65) Prior Publication Data
US 2006/0043694 A1 Mar. 2, 2006

Related U.S. Application Data

(60) Provisional application No. 60/605,509, filed on Aug. 31, 2004.

(51) Int. Cl.
B62D 53/06 (2006.01)

(52) U.S. Cl. ............ 280/441; 280/478.1; 280/901

(58) Field of Classification Search ........... 280/292, 280/441, 486, 487, 478.1, 401, 438.1, 901
See application file for complete search history.

(56) References Cited

U.S. PATENT DOCUMENTS

| 1,288,425 | A | * | 12/1918 | Keesler | 280/441 |
| 1,385,361 | A | * | 7/1921 | Clement | 280/445 |
| 1,606,379 | A | * | 11/1926 | Osterman | 280/486 |
| 1,752,638 | A | * | 1/1930 | Johnson | 280/444 |
| 1,995,920 | A | | 3/1935 | Gurton et al. | |
| 2,078,492 | A | | 4/1937 | Gurton et al. | |
| 3,345,081 | A | * | 10/1967 | Hartwig | 280/476.1 |
| 3,729,214 | A | | 4/1973 | Mulcahy et al. | |
| 3,826,516 | A | | 7/1974 | Weber | |
| 3,850,449 | A | | 11/1974 | Link et al. | |
| 3,893,710 | A | | 7/1975 | Madura | |
| 4,359,234 | A | | 11/1982 | Mittelstadt | |
| 4,429,892 | A | * | 2/1984 | Frampton et al. | 280/407 |
| 5,044,651 | A | | 9/1991 | Weikel | |
| 5,449,191 | A | | 9/1995 | Cattau | |
| 5,566,963 | A | | 10/1996 | Johnson | |
| 5,772,229 | A | | 6/1998 | Cattau | |
| 5,890,728 | A | | 4/1999 | Zilm | |
| 6,247,720 | B1 | | 6/2001 | Linger et al. | |
| 6,308,977 | B1 | | 10/2001 | Pulliam et al. | |
| 6,357,777 | B1 | | 3/2002 | Linger et al. | |
| 6,474,674 | B2 | * | 11/2002 | Piercey, III | 280/441 |
| 6,485,045 | B1 | | 11/2002 | King | |
| 6,557,883 | B2 | | 5/2003 | Linger et al. | |
| 6,685,210 | B2 | | 2/2004 | Lindenman et al. | |
| 6,981,715 | B1 | * | 1/2006 | Aylett | 280/441 |
| 2001/0020776 | A1 | * | 9/2001 | Linger et al. | 280/441 |

* cited by examiner

Primary Examiner—Paul N Dickson
Assistant Examiner—Maurice Williams
(74) Attorney, Agent, or Firm—Sander R. Gelsing

(57) ABSTRACT

A hitch for coupling a trailer to a towing vehicle includes a first coupling means for coupling with the trailer at a pivot point and a second coupling means for coupling with the trailer at a towing point. A displacing means is responsive to pivoting of the trailer with respect to the towing vehicle to move the hitch and the pivot point on the towing vehicle toward the rear of the vehicle when turning is effected and to move the hitch and the pivot point on the towing vehicle just forward of the vehicle's rear axle during normal longitudinal movement of the towing vehicle and trailer. The second coupling means is capable of transferring at least the majority of the towing force between the towing vehicle and the trailer.

9 Claims, 14 Drawing Sheets

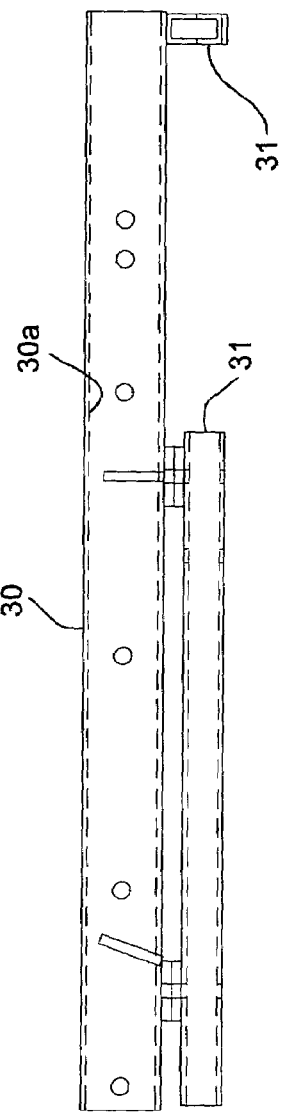
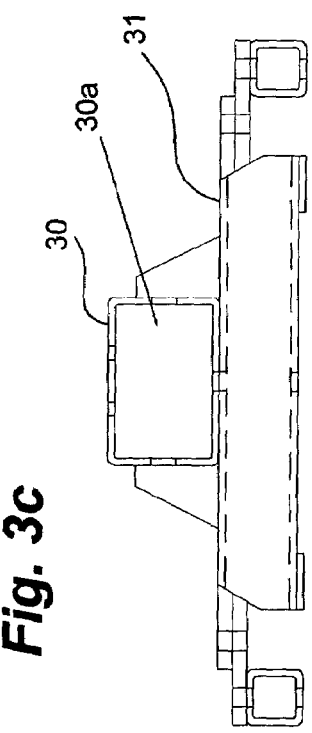
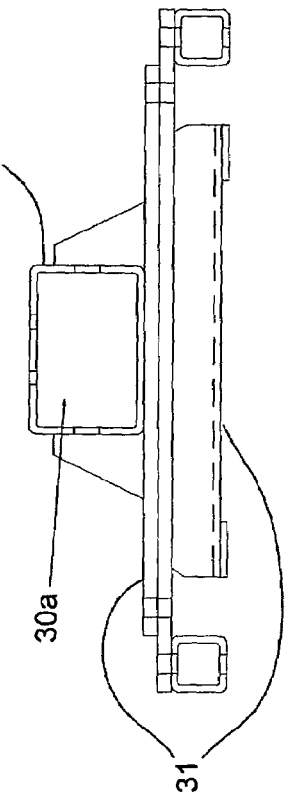
Fig. 3b
Fig. 3c
Fig. 3d

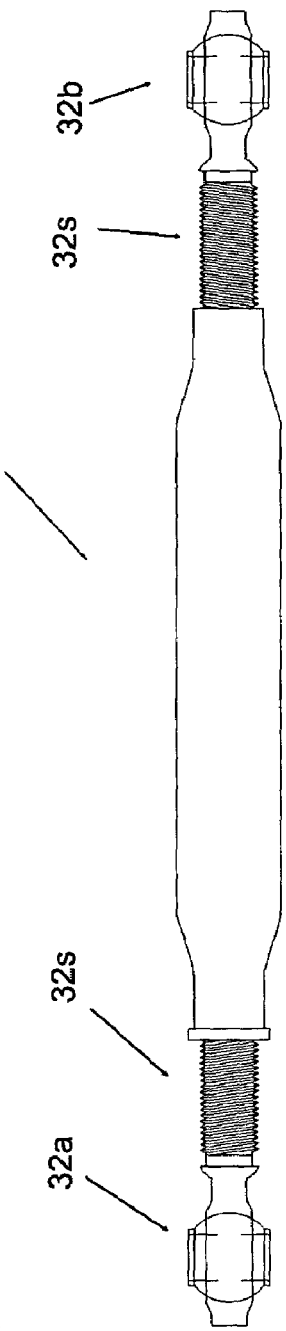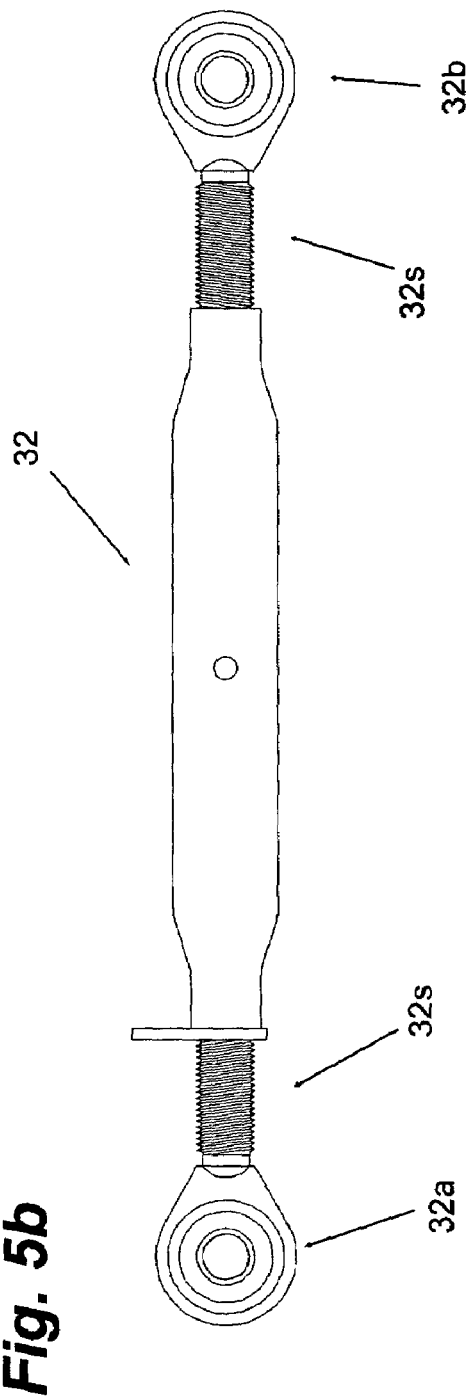
Fig. 5a
Fig. 5b

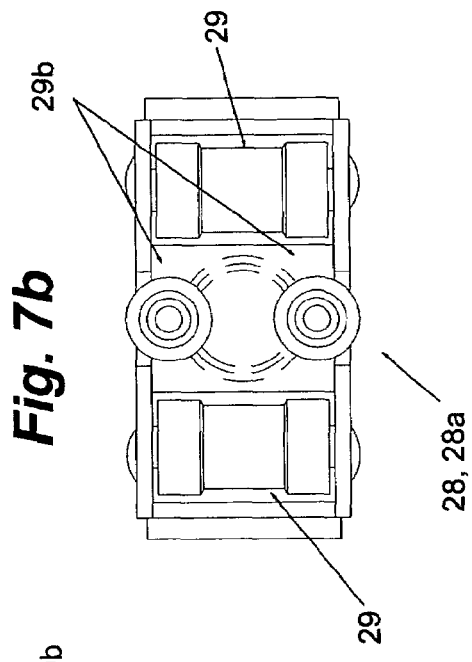
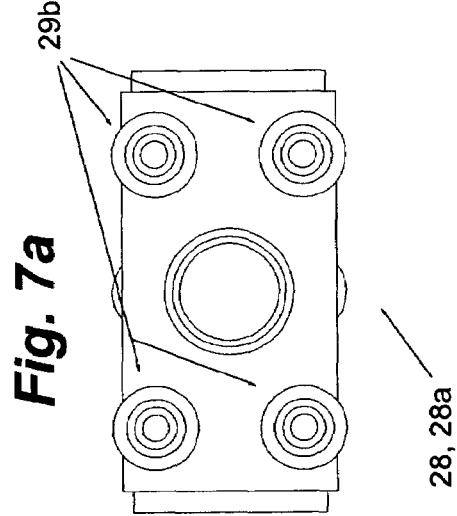
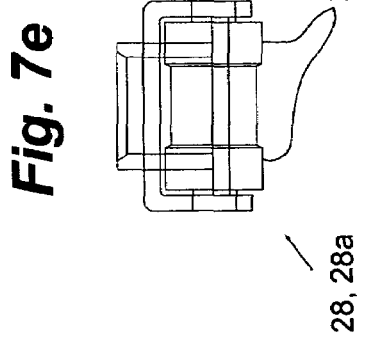
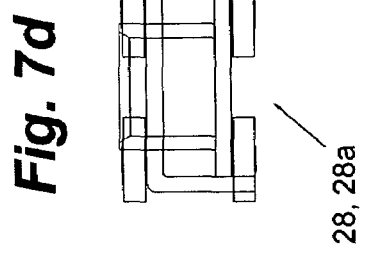
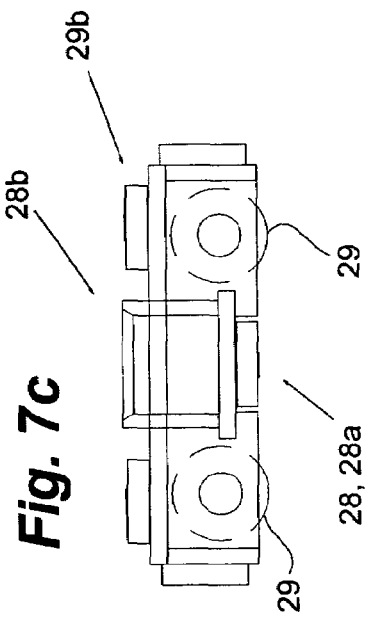

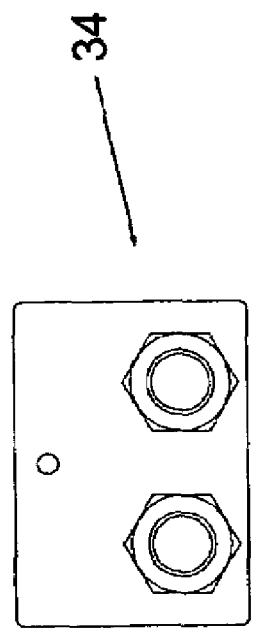

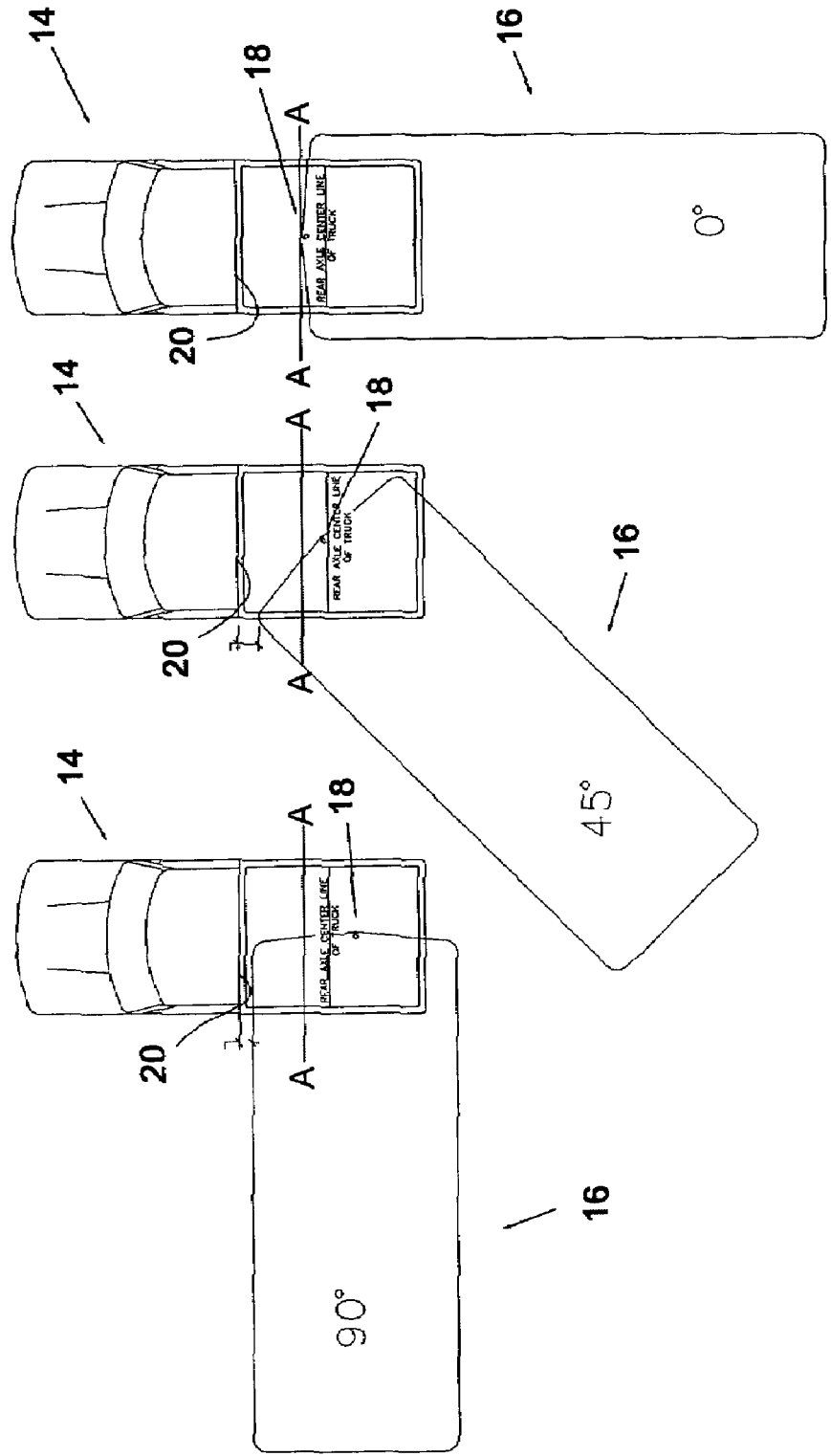

SELF-ADJUSTING FIFTH WHEEL TRAILER HITCH

CROSS REFERENCE TO RELATED APPLICATION

This application is a regular application of U.S. Provisional Patent Application Ser. No. 60/605,509 filed Aug. 31, 2004 and entitled, "SELF-ADJUSTING FIFTH WHEEL TRAILER HITCH", the entirety of which is incorporated herein by reference.

FIELD OF THE INVENTION

The present invention relates generally to a fifth wheel hitch assembly for use on pickup trucks and similar vehicles used to tow fifth wheel trailers and, more particularly, to a self-adjusting hitch which allows fifth wheel trailers to be towed using short bed pickup trucks and other trucks having a relatively short distance between the rear portion of the passenger compartment and the rear axle.

BACKGROUND OF THE INVENTION

The substantial weight of the fifth-wheel travel trailer requires proper mounting of the hitch assembly relative to the axles of the towing vehicle. Where the typical pick-up truck is employed as the towing vehicle, the fifth-wheel hitch is secured in the bed of the truck above and slightly in front of the rear axle. It is desirable that the mounting not be located too far forward of the rear axle so as to avoid unnecessary bending moments about the axle. It is also desirable not to mount the hitch rearward of the axle, otherwise the towing vehicle will tend to rear off its front wheels resulting in loss of steering control.

Where a long-bed truck is employed as the towing vehicle, relatively few difficulties are encountered in the proper mounting of a fifth wheel hitch. Recently, though, the popularity of the short-bed pick-up truck has grown. With such short-bed trucks there is a decreased distance between the rear axle of the truck and the cab. In such cases, and so as to provide adequate clearance between the forward portion of the trailer and the cab during turning operations, the hitch may be mounted rearward in the bed, behind the rear axle. However, as noted above, this creates an undesirable and potentially dangerous towing configuration.

U.S. Pat. No. 6,308,977 to Pulliam et al. teaches a self-adjusting fifth wheel hitch assembly which allows fifth wheel trailers to be towed using short bed pickup trucks, which prevents contact between the trailer and the truck during turning operations and which provides for the proper weight distribution, relative to the rear axle, during normal longitudinal movement of the truck and trailer.

The apparatus of Pulliam et al. includes a first hitch member on the trailer and a second hitch member on the towing vehicle. The hitch member on the towing vehicle is mounted on a sliding mount extending across the rear axle of the vehicle. A linkage is responsive to pivoting between the trailer and towing vehicle to move the hitch on the towing vehicle toward the rear of the vehicle when turning is effected and to move the hitch on the towing vehicle just forward of the rear axle during normal longitudinal movement of the truck and trailer.

However, design of Pulliam et al, is complex, has numerous moving and linked mechanical parts and has multiple hitch members. Many of these mechanical parts responsible for the self-adjustment and pivoting aspects are also subject to the towing force exerted by the truck onto the trailer. This places additional stress on these mechanical components.

What is needed is a self-adjusting fifth wheel hitch which is simple in design and does not have the above-mentioned disadvantages.

SUMMARY OF THE INVENTION

The sliding hitch assembly according to the present invention allows fifth wheel trailers to be towed safely and conveniently using short bed towing vehicles. The present sliding hitch assembly automatically pivots at a pivot point and moves rearward away from the vehicle's cab in response to the pivotal movement between the trailer and the vehicle that typically occurs during normal driving situations such as cornering, parking, etc. The hitch assembly responds almost instantaneously to any turns, thus substantially eliminating any lag or delay. In normal operating conditions the hitch assembly and the pivot point slide rearward far enough so that the trailer will not contact the vehicle's cab. The hitch also imparts or transmits most or all of the towing force, between the towing vehicle and the trailer, via a point that is different from the pivot point.

In one aspect of the invention there is provided a hitch for coupling a trailer to a towing vehicle which includes a first coupling means for coupling with the trailer at a pivot point and a second coupling means for coupling with the trailer at a towing point. A displacing means is responsive to pivoting of the trailer with respect to the towing vehicle to move the hitch on the towing vehicle toward the rear of the vehicle when turning is effected and to move the hitch on the towing vehicle just forward of the vehicle's rear axle during normal longitudinal movement of the towing vehicle and trailer. The second coupling means transfers at least the majority of the towing force between the towing vehicle and the trailer.

In another aspect of the invention there is provided a hitch for coupling a trailer to a towing vehicle which includes a hitch member on the trailer for securing said trailer to the towing vehicle. A sliding mount slidably mounts said hitch member for sliding movement longitudinally with respect to the towing vehicle. A linkage is capable of transferring at least the majority of the towing force exerted between the towing vehicle and the trailer and is responsive to pivoting of the trailer with respect to the towing vehicle to move said hitch member on said sliding mount as the trailer pivots with respect to the towing vehicle.

BRIEF DESCRIPTION OF THE DRAWINGS

FIGS. 3a-3d are top, side, rear and front views respectively of the guide of the embodiment of FIG. 1;

FIGS. 5a-5b are side and top views respectively of the linkage arm of the embodiment of FIG. 1;

FIGS. 7a-7c are top, bottom and side views respectively of the carriage of the embodiment of FIG. 1;

FIGS. 7d-7e are various cross sectional views of the carriage of the embodiment of FIG. 1;

FIGS. 9a-9c are side, front and top views of a linkage arm bracket of the embodiment of FIG. 1;

FIGS. 10a-10c are top plan views taken from above illustrating how a fifth wheel trailer turns and moves the pivot point relative to the rear of a pickup truck's cab when mounted to the pickup truck using the sliding fifth wheel hitch assembly of the present invention (hitch assembly not shown);

DETAILED DESCRIPTION OF THE PREFERRED EMBODIMENTS

Figure 1:
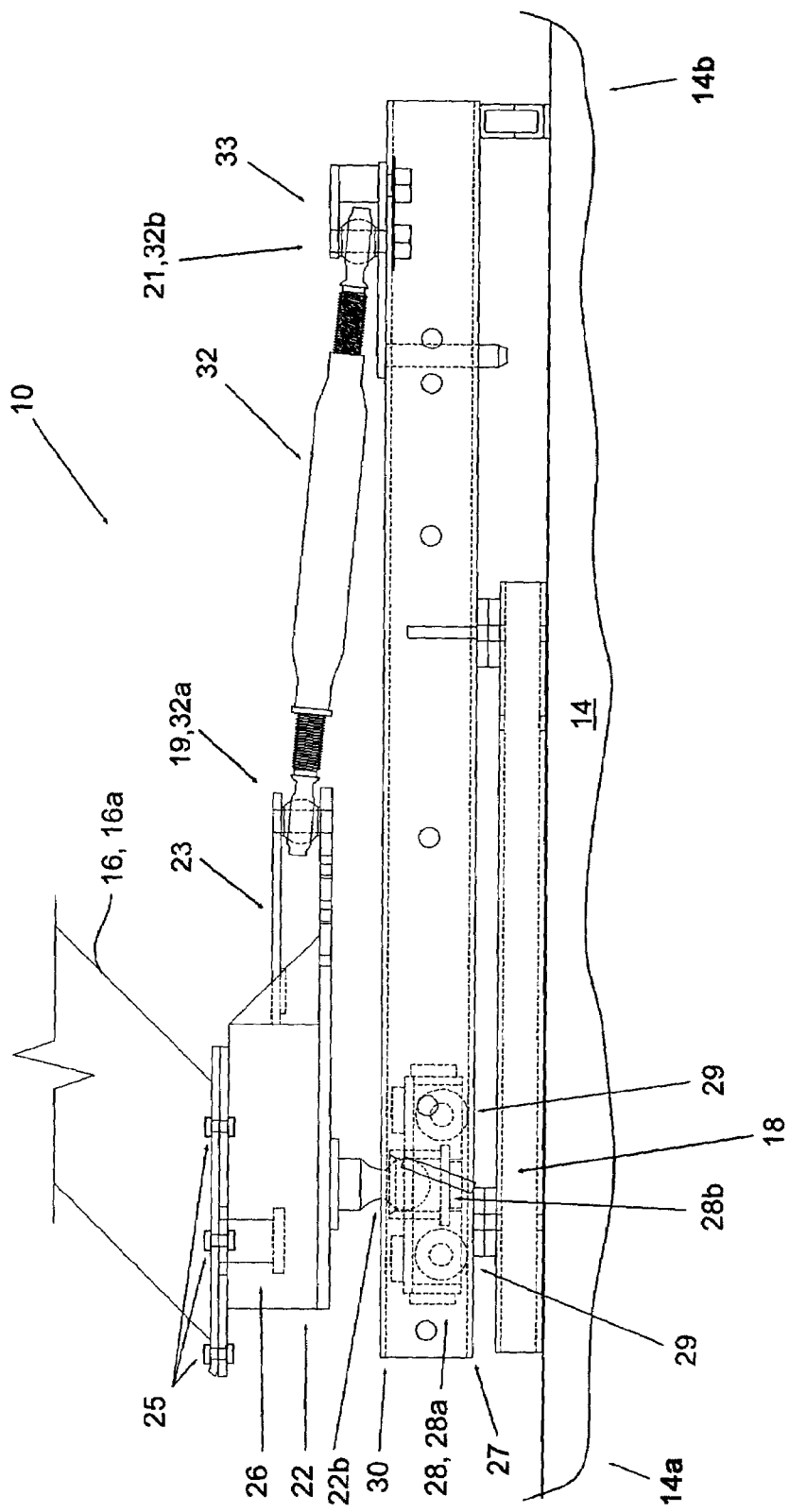
FIG. 1 is a side view of one embodiment of the sliding fifth wheel hitch assembly according to the present invention, shown mounted on the bed of a pickup truck.
Figure 2:
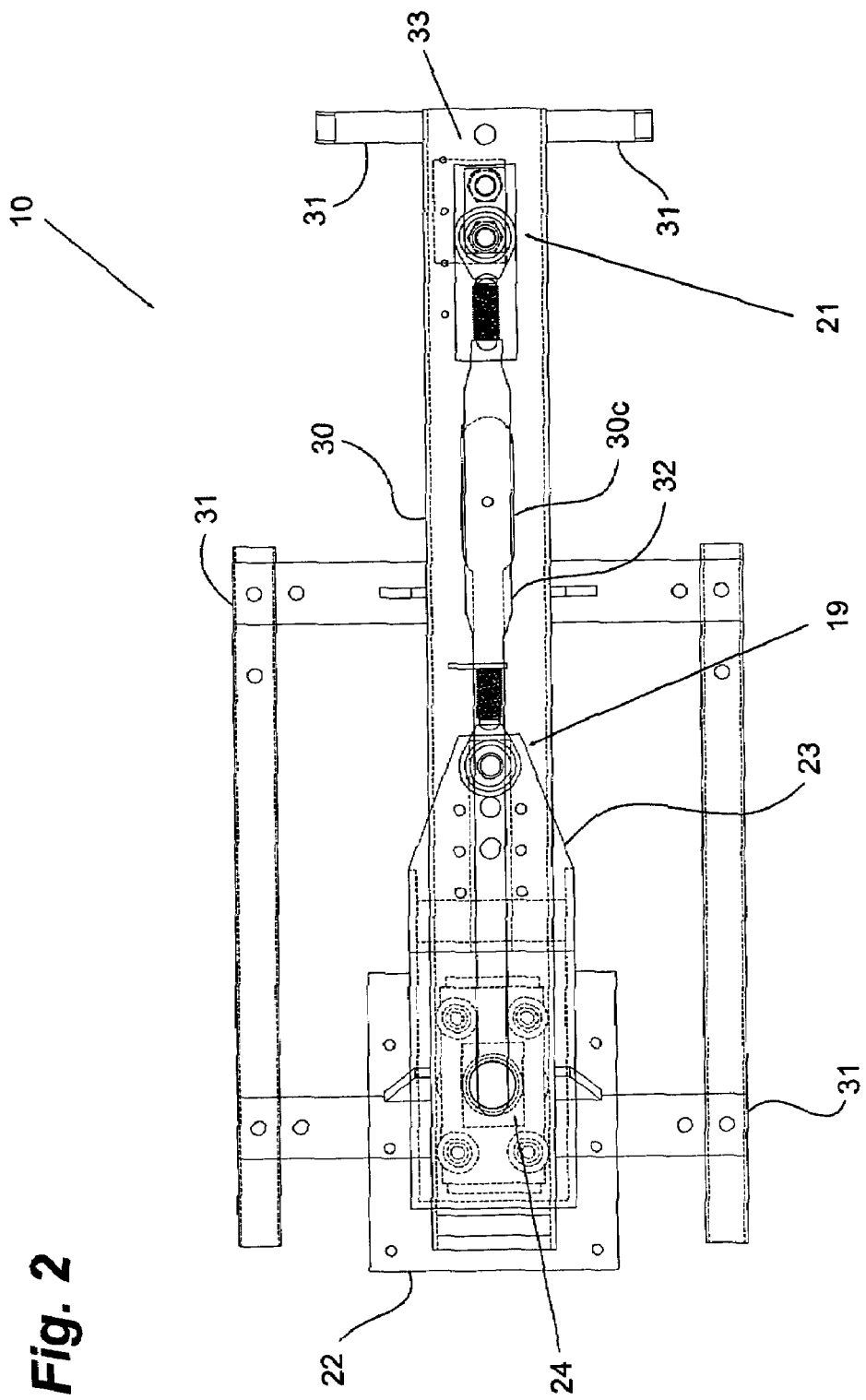
FIG. 2 is a top view of the sliding fifth wheel hitch of the embodiment of FIG. 1.
Figure 3A:
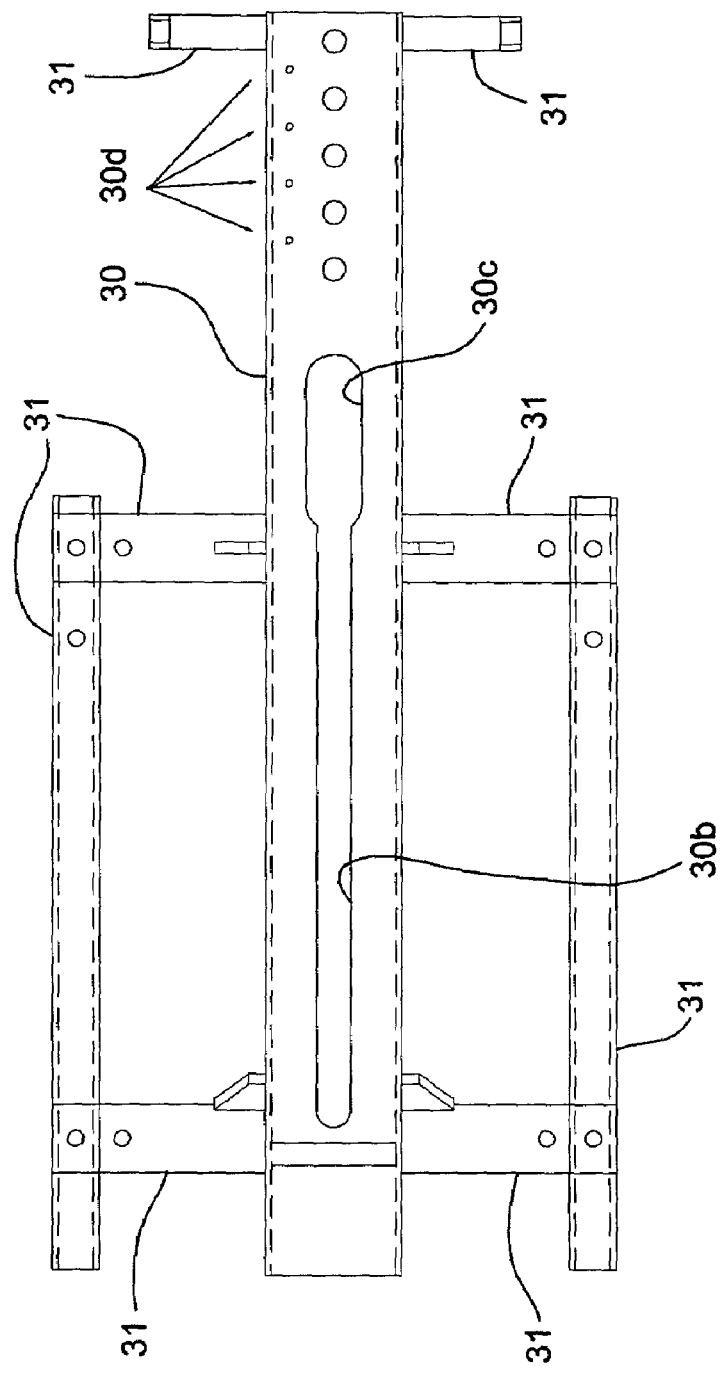
Figure 4A:
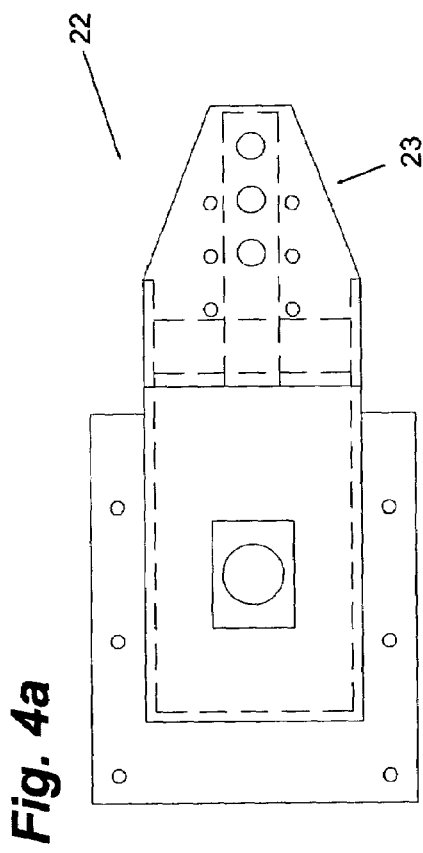
FIGS. 4a-4c are top, side and front views respectively of the receiver assembly of the embodiment of FIG. 1.
Figure 4C:
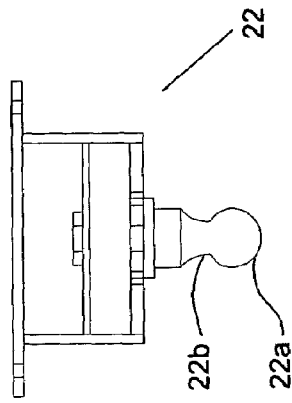
Figure 4B:
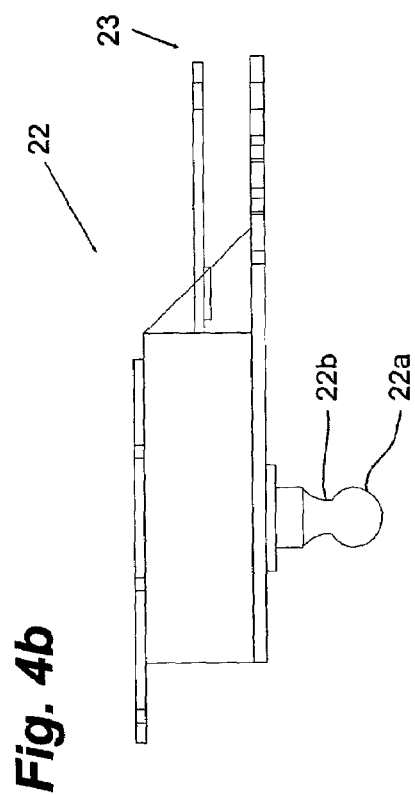
Figure 6B:
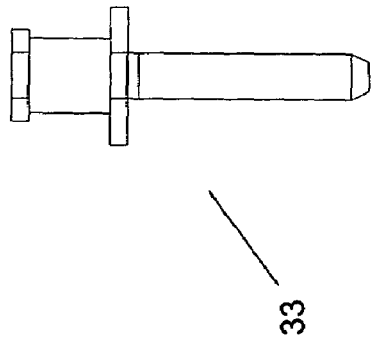
FIGS. 6a-6c are side, rear and top views respectively of the linkage arm receiver of the embodiment of FIG. 1.
Figure 6C:
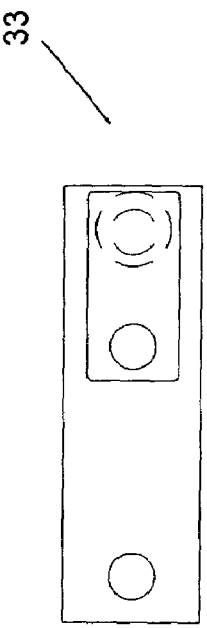
Figure 6A:
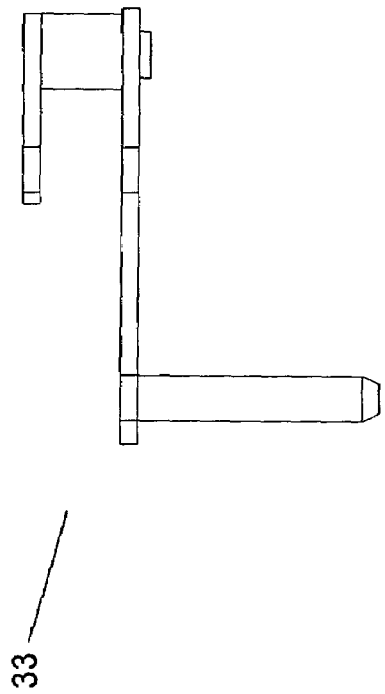

Reference is to be had to the Figures in which identical reference numbers identify similar components.

Referring to the Figures, a sliding fifth wheel hitch assembly 10 is mounted on a towing vehicle 14, such as a pickup truck, according to common industry practice. Preferably, hitch assembly 10 is secured to the frame of the towing vehicle 14 using conventional fasteners (not shown) and wherein 14a is towards the front end of the vehicle 14 and 14b is towards the rear end of the vehicle 14. The hitch assembly 10 is adapted to secure a fifth wheel trailer 16 to the towing vehicle 14 so that the trailer 16 can pivot relative to the towing vehicle 14 about a pivot point 18 (see FIGS. 10a-10c).

A hitch assembly 10 according to the present invention allows the pivot point 18 to slide in a rearward direction away from cab 20 and rearward from reference line A-A which is typically directly over, or in some circumstances slightly in front of, the center line of the truck axle (line A-A shown here as slightly in front of the center line of the truck axle), so that during all normal operating conditions the trailer 16 is prevented from contacting cab 20 of pickup truck 14.

Hitch assembly 10 comprises a receiver assembly 22 having an aperture 24 therein for accommodating a hitch pin 26 from a pin box or R.V. tongue 16a of the trailer 16. Preferably, hitch pin 26 substantially corresponds with pivot point 18, as can be seen in FIG. 1. The receiver assembly 22 is removably secured to the pin box 16a for pivotal movement therewith according to common industry practice. At this point any relative rotation between pin box 16a and receiver assembly 22 is prevented. Preferably the receiver assembly 22 is attached to the pin box 16a via nut-and-bolt fastener means 25 so as to firmly secure the pin box 16a to the receiver assembly 22.

The hitch assembly 10 further comprises a sliding mount 27 and a linkage arm 32. Preferably the sliding mount 27 comprises a moving assembly or carriage 28 and a carriage guide 30, the carriage 28 being constrained by the guide 30 for movement longitudinally with respect to the towing vehicle 14. More preferably, the hitch assembly 10 also comprises a guide frame 31. The receiver assembly 22 pivotally connects or couples to the sliding mount 27, preferably via the carriage 28 as described in further detail below.

The linkage arm 32 pivotally and operationally connects or couples between the receiver assembly 22 and the towing vehicle 14 at dual pivotable connections 32a, 32b, preferably one pivotable connection at each of the linkage arm's ends as shown in FIG. 1. More preferably, the dual pivotable connections 32a, 32b are in the form of a ball-and-socket joint as shown more clearly in FIG. 5, thereby providing pivoting capability in more than one plane. The linkage arm 32 connects to the towing vehicle 14 at a linkage point 21 and connects to the receiver assembly 22 at a point other than the pivot point 18. Preferably, the receiver assembly 22 further comprises an arm or tongue portion 23 that projects rearward from the pivot point 18 along the longitudinal axis of the trailer 16 and the linkage arm 32 connects at a point somewhere near the end of said arm portion 23, as shown in FIG. 1.

Thus, there are two pivotable connecting points on the receiver assembly 22, the first point is the pivot point 18 and the second point is a point other than the pivot point 18. The second point can also be referred to as a towing point 19 since it receives most or all of the towing force or draft during towing operations, as further described below. The towing point 19 is preferably located somewhere rearward of the pivot point 18.

In this embodiment, the linkage arm 32 operationally connects to the vehicle 14 via a receiver linkage arm receiver 33, which in turn is fastened to the guide 30 and guide frame 31 by means of a linkage arm bracket 34. Advantageously, the linkage arm receiver 33 and bracket 34 may be positioned along the guide 30 at a variety of positions by utilizing holes 30d and thereby facilitating adjustment of the linkage arm 32 and hitch assembly 10.

In another embodiment (not shown) the linkage arm 32 pivotally connects directly between the receiver assembly 22 and the towing vehicle 14. In yet another embodiment (not shown) the linkage arm 32 pivotally connects between the receiver assembly 22 and the vehicle 14 via a bracket or other connecting means. In yet another embodiment (not shown) the hitch assembly 10 does not have guide frame 31 and the guide 30 is fastened directly to the vehicle 14 without such a frame.

Advantageously, during operation all, or at least the majority, of the pulling or pushing force exerted by the towing vehicle 14 on the trailer 16 is transferred through the linkage arm 32. More advantageously, the sliding mount 27 and its carriage 28 only bear the gravitational weight of the trailer 16 that is normally carried by the towing vehicle 14. Even more advantageously, the carriage 28, and any mechanical components it may have, are not subjected to all, or at least the majority, of the pulling or pushing forces between the towing vehicle 14 and the trailer 16.

These pulling or pushing forces, sometimes referred to as towing forces or draft, are instead conveyed to the trailer 16 via the towing point 19. The pivot point 18 and the carriage 28 move along the longitudinal axis of the sliding mount 27 during operation, thereby preventing contact between the trailer and the towing vehicle's cab during turning operations and also providing proper weight distribution, relative to the rear axle, during normal longitudinal movement of the towing vehicle and trailer.

The carriage 28 of the preferred embodiment comprises a trolley 28a having wheels 29 and bearings 29b. Preferably the wheels 29 are made from steel. The trolley 28a is mounted within, and is constrained by, a longitudinal channel 30a within the guide 30. Rotation of the wheels 29 and bearings 29b, during operation of the hitch 10, allow the carriage 28 to move longitudinally with respect to the towing vehicle 14 inside the channel 30a. In an alternate embodiment (not shown) the carriage 28 could be slidably mounted for longitudinal movement along the guide 30, for example by being slidably mounted on one or more rods (not shown).

In this embodiment the pivotable connection between the receiver assembly 22 and the carriage 28, at the pivot point 18, is accomplished by a ball-and-socket joint, wherein the ball 22a projects from the receiver assembly 22 and the socket 28b is on the carriage 28, thereby providing pivoting capability in more than one plane. Preferably, and as shown in this embodiment, the ball 22a mounts to the receiver assembly 22 via a neck portion 22b which is narrower than the diameter of the ball 22a. More preferably, the guide 30 further comprises a longitudinal slot 30b which allows for movement of the neck portion 22b along its length, but prevents passage of the ball 22a through the slot. Advantageously, during normal operation the ball 22a is captured inside the channel 30a by the slot 30b thereby preventing the receiver assembly 22 from disengaging from the carriage 28. Even more preferably, a widened end 30c of the slot 30b allows for insertion and removal of the receiver assembly's ball 22a into and out of the longitudinal channel 30a and the carriage's socket 28b.

Figure 8B:
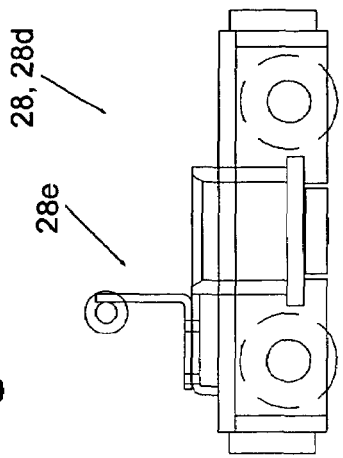
FIGS. 8a-8c are top, side and cross sectional views of another embodiment of a carriage having a handle.
Figure 8C:
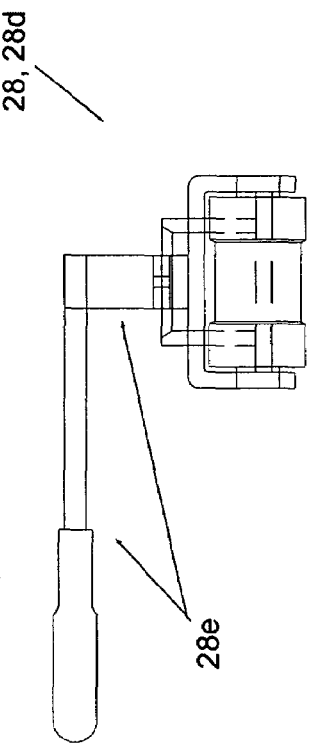
Figure 8A:
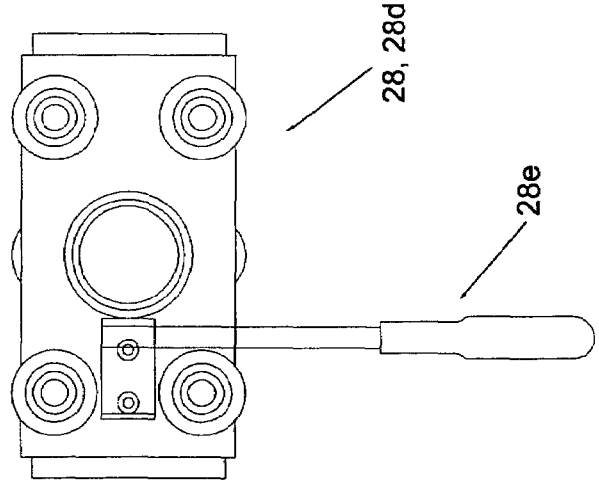

Referring now to FIGS. 8a-8c an alternate embodiment of the carriage 28 is shown. This embodiment of the carriage 28 features a handle 28e to facilitate alignment of the carriage's socket 28b with the receiver assembly's ball 22a during insertion of the ball 22a into the longitudinal channel 30a or to facilitate alignment of the carriage 28 and receiver assembly 22 combination underneath the pin box or R.V. tongue 16a during connection of the pin box 16a to the receiver assembly 22.

Operation

Referring to Figures, and during operation when the towing vehicle 14 and trailer 16 encounter a turn in the road, the trailer 16 and receiver assembly 22 pivot relative to the vehicle 14, guide 30 and carriage 28, which is about a vertical axis which coincides with pivot point 18. The linkage arm 32 pivots relative to the trailer 16 and receiver assembly 22 at the towing point 19 and also pivots relative to the vehicle 14 and linkage arm receiver 33 at the linkage point 21.

Rotation of the trailer 16 and receiver assembly 22 combination, at the pivot point 18 and relative to the guide 30 and the vehicle 14, along with the pivotal connection of the receiver assembly 22 to the to the vehicle 14 via the linkage arm 32 and its dual pivotable connections 32a, 32b, at the towing point 19 and linkage point 21 respectively, activates the sliding mount 27 and causes the carriage 28 to move in a rearward direction D and away from the cab 20 of the vehicle 14, thereby providing enough room for trailer 16 to pivot without contacting cab 20 of the vehicle 14. Likewise, when the vehicle/trailer combination straightens out and returns from the turned position, the carriage 28 is caused to move in a forward direction, towards the cab 20 and above or in front of the rear axle center line of the vehicle 14.

Figure 11:
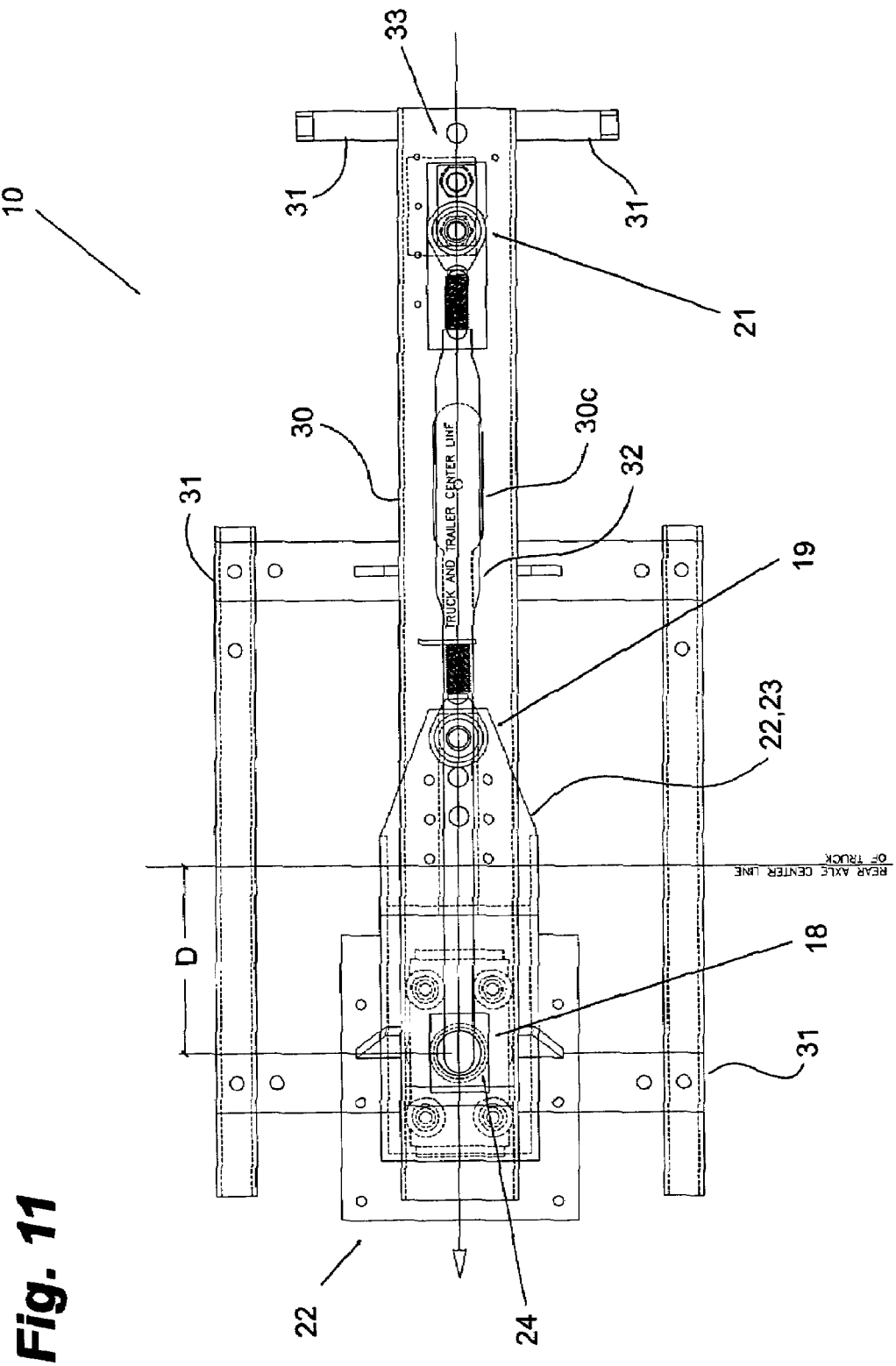
FIGS. 11-13 are top views of the sliding fifth wheel hitch assembly of the embodiment of FIG. 1 as it would be situated with the trailer in the positions of FIGS. 10a-10c respectively.
Figure 12:
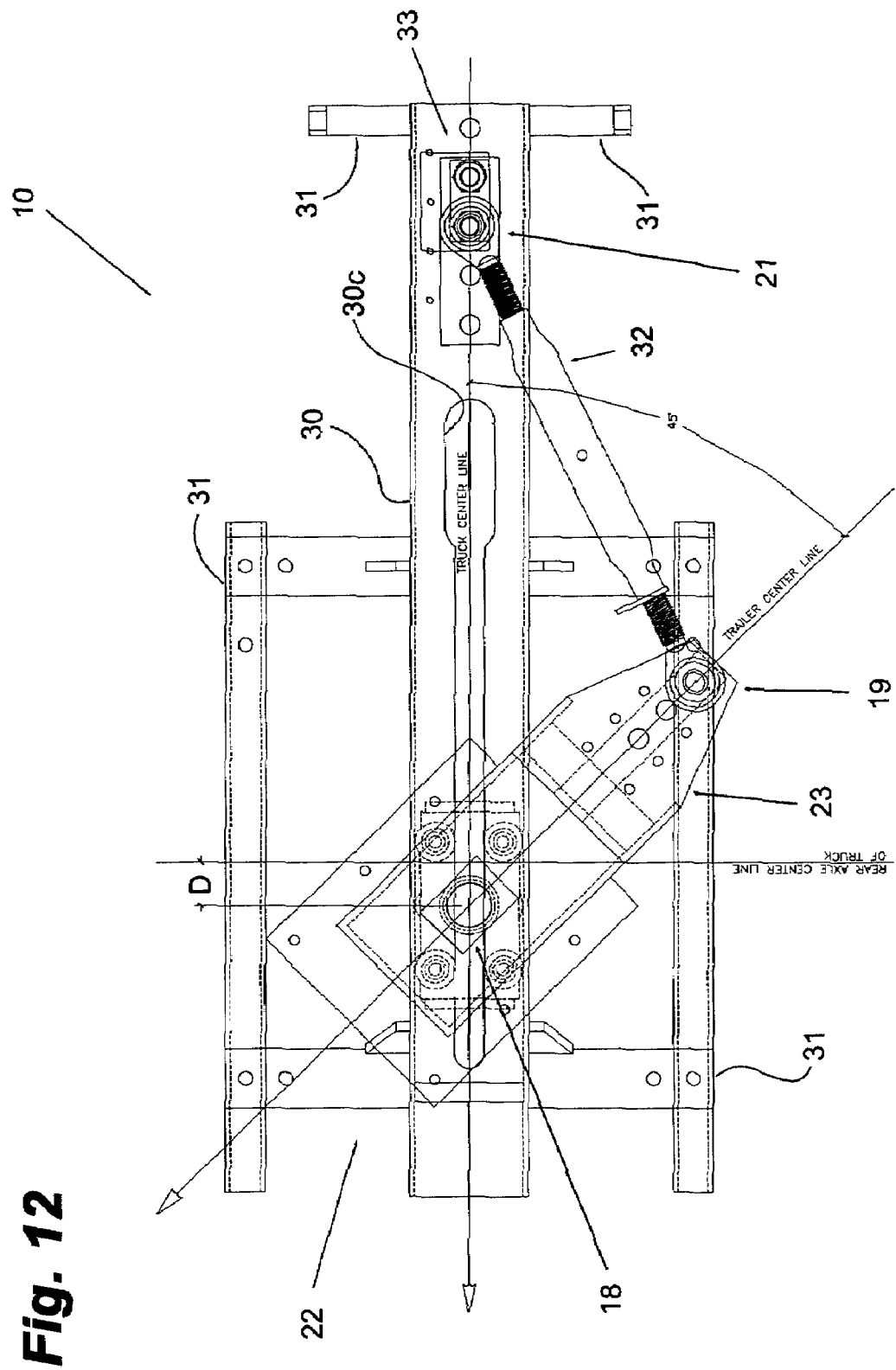
Figure 13:
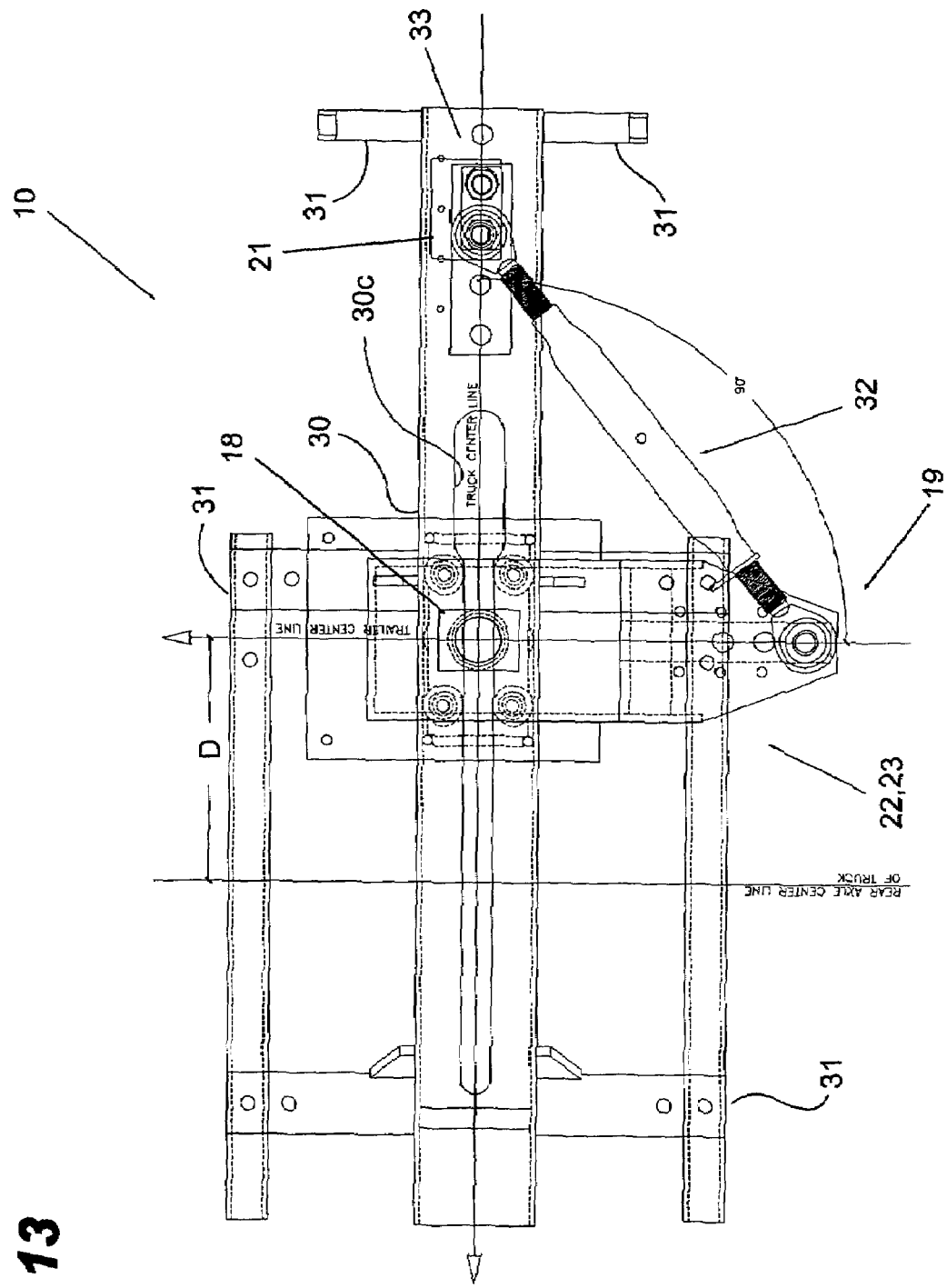

In particular, when the trailer 16 turns relative to the towing vehicle 14 as shown in FIGS. 12-13, the receiver assembly 22 turns relative to the vehicle 14. This rotation of the receiver assembly 22 causes the linkage arm 32 to pivot at the linkage point 21 and angle away from the longitudinal axis of the vehicle's center line, thereby causing a moment which draws the receiver assembly 22 supported by the carriage 28 away from front end 14a along the guide 30. In the process, the hitch pin 26 carried by the receiver assembly 22 moves in a rearward direction away from the cab 20 of the towing vehicle 14, thereby providing enough room for trailer 16 to pivot without contacting the cab 20 of the towing vehicle 14. When the vehicle/trailer combination straightens out and returns from the turned position shown in FIGS. 12-13 to the straight position of FIG. 11, the linkage arm 32 pivots at the linkage point 21, angling closer towards being parallel with the longitudinal axis of the vehicle's center line, thereby causing a moment which urges the receiver assembly 22 supported by the carriage 28 towards the front end 14a along the guide 30.

Advantageously, the mechanical interaction of the receiver assembly 22 with the sliding mount 27 and the linkage arm 32, and the dual pivotable connections 32a, 32b of the linkage arm 32 at the towing point 19 and at the linkage point 21, provides the hitch assembly 10 with a significant amount of travel distance D when the trailer 16 pivots relative to the towing vehicle 14.

More advantageously, the distance along the arm portion 23 (i.e. the distance between the pivot point 18 and towing point 19) and the distance between the dual pivotable connections 32a, 32b of the linkage arm 32 (i.e. the distance between the towing point 19 and the linkage point 21) can both be varied thereby providing a greater or lesser amount of longitudinal travel D of the pivot point 18 along the sliding mount as may be desired. This can be accomplished by providing a receiver assembly 22 with a longer or shorter arm portion 23, as may be desired, or by providing a linkage arm 32 that is longer or shorter, as may be desired. Even more preferably, the linkage arm 32 further comprises adjustable ends 32s that are screwably adjustable (as more clearly shown in FIGS. 5a and 5b) so as to easily vary the length of the linkage arm 32.

Trailer Detachment

The trailer 16 can be detached or decoupled from the hitch 10 by removing the receiver assembly 22 from the pin box 16a. Alternatively, and in the preferred embodiment, the linkage arm 32 may be disconnected from either the receiver assembly 22 or the hitch 10, thereby allowing the receiver assembly 22 to uncouple from the hitch and the ball 22a to be removed from the socket 28b of the carriage 28 through the widened end 30c of the guide 30.

Other Embodiment

In yet another embodiment (not shown), the hitch assembly 10 comprises a sliding mount 27 and a linkage arm 32, as described above. However, in this embodiment, the hitch assembly 10 lacks a receiver assembly and, instead, the sliding mount 27 couples directly to the hitch pin 26 of the trailer 16. Preferably the hitch pin 26 is in the form of a ball 22a having a neck portion 22b and socket 28b on the carriage 28 is suitable for engaging said hitch pin 26.

Additionally, in this embodiment, the linkage arm 32 pivotally and operationally connects between the trailer 16 and the towing vehicle 14 at the dual pivotable connections 32a, 32b, similar to the connection of the linkage arm 32 between the receiver assembly 22 and the towing vehicle 14 as discussed above. However, instead of connecting to a receiver assembly, the linkage arm 32 pivotally connects to the trailer 16 at the towing point 19 via a linkage mounting means, such as a bracket, a shaft or bolt means. Preferably, this linkage mounting means is at a point some distance to the rear of the hitch pin 26.

The embodiments of the invention in which an exclusive property or privilege is being claimed are defined as follows:

1. A hitch for coupling a trailer to a towing vehicle, said trailer pivoting with respect to the towing vehicle to effect turning, said hitch comprising:
   a hitch member on the trailer for securing said trailer to the towing vehicle at a pivot point;
   a non-pivoting sliding mount slidably mounting said hitch member for sliding movement longitudinally with respect to the towing vehicle; and
   a linkage capable of transferring at least the majority of the towing force exerted between the towing vehicle and the trailer and responsive to pivoting of the trailer with respect to the towing vehicle to move said hitch member on said non-pivoting sliding mount as the trailer pivots with respect to the towing vehicle;

wherein said linkage is connected between the hitch member and the towing vehicle at dual pivotable connections;

wherein said linkage connects to the towing vehicle at a linkage point and to the hitch member at a point other than the pivot point.

2. A hitch for coupling a trailer to a towing vehicle, said trailer pivoting with respect to the towing vehicle to effect turning, said hitch comprising:

a hitch member on the trailer for securing said trailer to the towing vehicle;

a non-pivoting sliding mount slidably mounting said hitch member for sliding movement longitudinally with respect to the towing vehicle; and a linkage capable of transferring at least the majority of the towing force exerted between the towing vehicle and the trailer and responsive to pivoting of the trailer with respect to the towing vehicle to move said hitch member on said non-pivoting sliding mount as the trailer pivots with respect to the towing vehicle;

wherein said linkage is not connected to the sliding mount.

3. A hitch for coupling a trailer to a towing vehicle, said trailer pivoting with respect to the towing vehicle to effect turning, said hitch comprising:

a hitch member on the trailer for securing said trailer to the towing vehicle;

a non-pivoting sliding mount slidably mounting said hitch member for sliding movement longitudinally with respect to the towing vehicle; and a linkage capable of transferring at least the majority of the towing force exerted between the towing vehicle and the trailer and responsive to pivoting of the trailer with respect to the towing vehicle to move said hitch member on said non-pivoting sliding mount as the trailer pivots with respect to the towing vehicle;

wherein said hitch member comprises a receiver assembly having an arm portion;

wherein said linkage is connected between the arm portion of the hitch member and the towing vehicle.

4. A hitch for coupling a trailer to a towing vehicle, said trailer pivoting with respect to the towing vehicle to effect turning, said hitch comprising:

a hitch member on the trailer for securing said trailer to the towing vehicle;

a non-pivoting sliding mount slidably mounting said hitch member for sliding movement longitudinally with respect to the towing vehicle; and a linkage capable of transferring at least the majority of the towing force exerted between the towing vehicle and the trailer and responsive to pivoting of the trailer with respect to the towing vehicle to move said hitch member on said non-pivoting sliding mount as the trailer pivots with respect to the towing vehicle;

wherein said sliding mount further comprises:

a wheeled carriage; and a carriage guide;

wherein said linkage is connected between the hitch member and said carriage guide.

5. A hitch for coupling a trailer to a towing vehicle, said trailer pivoting with respect to the towing vehicle to effect turning, said hitch comprising:

a hitch member on the trailer for securing said trailer to the towing vehicle;

a non-pivoting sliding mount slidably mounting said hitch member for sliding movement longitudinally with respect to the towing vehicle; and a linkage capable of transferring at least the majority of the towing force exerted between the towing vehicle and the trailer and responsive to pivoting of the trailer with respect to the towing vehicle to move said hitch member on said non-pivoting sliding mount as the trailer pivots with respect to the towing vehicle;

wherein said sliding mount further comprises:

a wheeled carriage; and a carriage guide;

wherein said carriage guide further comprises a guide frame;

wherein said linkage is connected between the hitch member and said guide frame.

6. A hitch assembly for coupling a trailer having a hitch pin and a linkage mounting means to a towing vehicle, said trailer pivoting with respect to the towing vehicle to effect turning, said hitch assembly comprising:

a sliding mount slidably mounting said hitch pin for sliding movement longitudinally with respect to the towing vehicle; and a linkage capable of transferring at least the majority of the towing force between the towing vehicle and the trailer and responsive to pivoting of the trailer with respect to the towing vehicle to move said hitch pin on said sliding mount as the trailer pivots with respect to the towing vehicle;

wherein said linkage is not connected to the sliding mount and wherein said sliding mount further comprises:

a wheeled carriage; and a carriage guide.

7. The hitch assembly of claim 6 wherein said carriage guide further comprises a guide frame.

8. The hitch assembly of claim 6 wherein said linkage is connected between the linkage mounting means and said carriage guide.

9. The hitch assembly of claim 7 wherein said linkage is connected between the linkage mounting means and said guide frame.

* * * * *